United States Patent [19]

Lofquist et al.

[11] 3,964,861
[45] June 22, 1976

[54] ALKOXYLATED ALIPHATIC AMINES TO INHIBIT OZONE FADING OF DYED POLYAMIDES

[75] Inventors: Robert Alden Lofquist; Peter Reginald Saunders, both of Richmond, Va.

[73] Assignee: Allied Chemical Corporation, Petersburg, Va.

[22] Filed: Jan. 28, 1974

[21] Appl. No.: 437,255

Related U.S. Application Data

[63] Continuation-in-part of Ser. No. 211,695, Dec. 23, 1971.

[52] U.S. Cl. .......................................... 8/165; 8/74
[51] Int. Cl.² ............................................ D06P 1/36
[58] Field of Search ................................... 8/165, 74

[56] References Cited
UNITED STATES PATENTS

| | | | |
|---|---|---|---|
| 2,409,325 | 10/1946 | Ward | 8/165 |
| 2,706,142 | 4/1955 | Von Glahn | 8/165 |
| 2,828,180 | 3/1958 | Sertorio | 8/62 |
| 3,071,427 | 1/1963 | Buehler | 8/22 |
| 3,096,139 | 7/1963 | Hindle | 8/21 A |
| 3,199,942 | 8/1965 | Kuth et al. | 8/169 |
| 3,503,698 | 3/1970 | Zurbucher | 8/172 |
| 3,716,328 | 2/1973 | Mayer | 8/165 |

OTHER PUBLICATIONS

Salvin, Textile Research J. 1955 pp. 571–585.
Salvin, Amer. Dyestuff. Reporter, pp. 12–20 Jan. 6, 1964.

*Primary Examiner*—Donald Levy
*Attorney, Agent, or Firm*—Richard A. Anderson

[57] ABSTRACT

When from about 0.4% to about 5% of tertiary amines

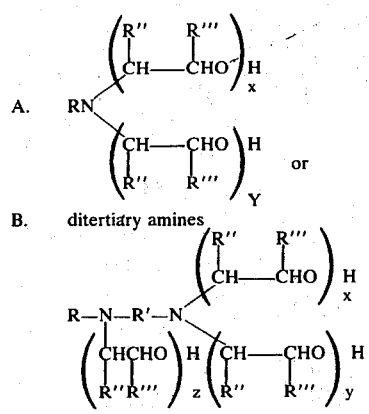

where R is an alkyl radical of 8–25 carbon atoms, R' is an alkylene radical of 2 to 10 carbon atoms, R" and R'" are hydrogen, a phenyl, or an alkyl radical of 1 to 3 carbons, but where R" and R'" are not both hydrogen, and $x$, $y$, and $z$ are each at least 1 $(x+y)$ is not greater than 6, preferably 2, and $(x+y+z)$ is not greater than 9, preferably 3, are coated on nylon fiber, or are added to the dyebath, improved dyefastness is achieved compared to an untreated dyed nylon fiber when this fiber is exposed to ozone.

6 Claims, No Drawings

ALKOXYLATED ALIPHATIC AMINES TO INHIBIT OZONE FADING OF DYED POLYAMIDES

BACKGROUND OF THE INVENTION

This is a continuation-in-part of application Ser. No. 211,695, filed Dec. 23, 1971.

The object of this invention is to reduce or prevent the fading of dyed nylon fabrics, such as nylon carpets, caused by ozone.

Ozone is generally present in air at sea level at concentrations of only 1 to 5 parts per hundred million (pphm). Only under conditions of heavy smog, where sunlight acts on a combination of unburned hydrocarbons from gasoline and oxides of nitrogen does the ozone concentration exceed these concentrations. However, even at the low ozone concentrations, if the humidity is high enough (i.e., over 75% R. H.) ozone fading occurs.

Ozone is a molecular form of oxygen which has three atoms of oxygen instead of the normal two atoms of oxygen per molecule. It is a very powerful oxidizing agent; and a strong electrophilic reagent, that is, it searches out and attacks electron pairs such as exist with carbon-to-carbon double bonds.

Dyes have a multiplicity of double bonds, and perhaps for this reason are very sensitive to ozone.

The dyes in nylon which are most seriously attacked are those which are mobile in the nylon, such as disperse dyes. The most sensitive disperse dyes are usually blue anthraquinone dyes, although there is evidence that under high humidity and high ozone concentration, almost all dyes are affected by ozone.

High humidity is necessary to cause noticeable ozone fading. Apparently moisture provides the dye sufficient mobility to diffuse to the surface of the yarn where the destruction of the dye occurs.

A number of chemicals have been described in the literature to protect rubber from ozone. Examples are paraphenylenediamine derivatives, and dihydroquinoline derivatives. These chemicals seriously discolor nylon, especially after exposure to light.

SUMMARY OF THE INVENTION

A method and composition has been found for improving the fastness of dyes when exposed to ozone in polycarbonamide fibers. The method consists of coating the fibers before, during or after dyeing with a compound, which remains in or on the fiber, selected from the group consisting of tertiary amines and ditertiary amines of the formulae A. 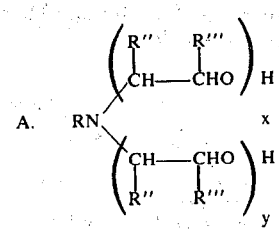

where R is an alkyl radical having from 8–25 carbon atoms; R'' is hydrogen, a phenyl or an alkyl of 1 to 3 carbons; R''' is hydrogen, a phenyl or an alkyl of 1 to 3 carbons, but where not both R'' and R''' are hydrogen; and $x$ and $y$ are at least 1 and $(x+y)$ is not greater than 6, preferably 2, or B. ditertiary amines such as

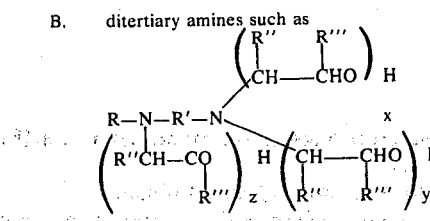

wherein R is an alkyl radical of 8–25 carbon atoms; R' is an alkylene radical of 2 to 10 carbon atoms; R'' is hydrogen, a phenyl, an alkyl radical of 1 to 3 carbon atoms; R''' is hydrogen, a phenyl, or an alkyl radical of 1 to 3 carbon atoms but where R'' and R''' are not both hydrogen; and $x$, $y$ and $z$ are each at least 1, and $(x+y+z)$ is not greater than 9, preferably 3.

One of these compounds or mixtures of them can be coated on nylon fiber in amounts from 0.4% to about 5% based on the weight of the fiber. Alternatively, the above compounds can be added to the dye bath so as to impregnate the yarns with 0.4 to 5% of the compounds.

The rate of fading of the dye in nylon fibers, particularly disperse or cationic dyes, is substantially reduced by the incorporation or coating of these alkoxylated amines or diamines of the above formulae.

DESCRIPTION OF THE PREFERRED EMBODIMENTS

Some of the preferred embodiments of this invention are set forth in the following examples. The method of testing for ozone fading is similar to the AATCC Test 129-1968 set forth on page 334/15 of *The Journal of American Association of Textile Chemists and Colorists*, July 30, 1969, Volume 1, No. 16, in an article entitled, "A New Test Method For Ozone Fading at High Humidity", by Victor S. Salvin.

The method and the means of measuring the loss of dye consists in dyeing the yarn with a selected dye or dyes, exposing it to ozone at a concentration of 80 parts per hundred million in a test chamber together with a control nylon sample which was dyed an avocado shade. The control sample is examined periodically until the resulting color corresponds to that of the Standard of Fading (one cycle). It has been found that one cycle is completed when the internal standard has faded sufficiently to give a ΔE of 2.8, compared to the unexposed standard.

ΔE is a measure of the change of color between two samples, a smaller ΔE being a closer match, or less fading of one sample compared to the second sample.

This color difference, ΔE, was measured with a Hunterlab Color Difference Meter. This instrument measures color as seen in average daylight in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. These measurements made correspond to the way the average human eye responds to light.

$$\Delta E = \sqrt{(\Delta L)^2 + (\Delta a)^2 + (\Delta b)^2}$$

where $\Delta L$ is $L_1 - L_2$

Δa is $a_1 - a_2$

Δb is $b_1 - b_2$ and

L, a, and b are readings on the Hunterlab Color Difference Meter.

L is a 100 to 0 reading of white to black;

a indicates redness when positive, gray when zero, and green when negative;

b indicates yellow when positive, gray when zero and blue when negative.

The following are examples of the subject additives and their behavior on being coated onto yarn, dyed and exposed to ozone, or on being coated on dyed sleeves and exposed to ozone.

EXAMPLE I

Propoxylated Cocoamine

One thousand grams of polycaprolactam of about 60 formic acid relative viscosity, containing about 90 equivalents of sulfonate as sodium sulfoisophthalic acid, having about 80 carboxyls and 20 amines per $10^6$ grams of polymer were spun into yarn at a spinning temperature of 280°C., plied and drawn at a 3.2 draw ratio into a 140 filament 2100 total denier yarn. A commercial aqueous spin finish was applied to the yarn before drawing. The filaments had a Y cross-section with a 3.2 modification ratio.

This yarn, and a yarn made and spun in the same manner, but with an aqueous spin finish containing about 8% of propoxylated coco amine, Varonic K202P manufactured by Varney Chemical Company. The finish pickup was 10% O. W. F. (on weight of fiber).

Both yarns were knitted into sleeves. The sleeves were heat set by steam treating in an autoclave at 230°F. for five minutes followed by three 10-minute cycles of steam treatment at 260°F.

The sleeves were dyed to a moss green in a dye bath composed as follows:

0.3% Sevron Yellow 8GMF (DuPont)
0.25% Astrazon Blue 3RL (Verona), C. I. 61111
2.0% Hipochem PND-11 (amine salt of alcoholester)*
1.0% Hipochem CDL-60 (non-ionic surfactant)*
and sufficient monosodium and/or disodium phosphate to adjust the pH to 7.0 ± 0.2.

* from Highpoint Chemical Company

The percents are based on weight of fabric. The liquor to fabric ratio was 40 to 1. Astrazon Blue 3RL is a cationic blue dye known to be sensitive to ozone.

The dyed sleeves were then exposed to three cycles of ozone in an atmosphere of about 80 pphm of ozone at a temperature of 104°F. at a relative humidity of at least 95%. A cycle is that exposure which is completed when the internal nylon standard, dyed olive 1, has faded sufficiently to give a ΔE of 2.8. Measurement of ΔE is discussed under "Description of the Preferred Embodiments".

The results of ozone exposure are tabulated below:

| Yarn | 3 cycles ΔE | ΔL |
|---|---|---|
| Control Nylon | 13.0 | 8.7 |
| Nylon with propoxylated cocoamine in the finish | 6.6 | 4.0 |

EXAMPLE II

Polymer made from caprolactam, having a formic acid relative viscosity of 46, about 81 sulfonic groups from sodium sulfoisophthalate, about 90 carboxyls and about 25 amine ends per million grams of polymer, was spun into yarn. The yarn, coated with a commercial aqueous spin finish was drawn at a draw ratio of 2.9. The yarn had a Y cross-section with a 3.2 modification ratio and each filament had a denier of 15.

The yarn was chopped into 7 inch lengths, carded and spun into staple yarn having a cotton count of 2. The yarn was knitted into sleeves, and heat set by steam treating in an autoclave at 230°F. for five minutes followed by three 10-minute cycles of steam treatment at 260°F.

The sleeves were dyed to a moss green in a dye bath composed as follows:

0.3% Sevron Yellow 8GMF (DuPont)
0.25% Astrazon Blue 3RL (Verona)
2.0% Hipochem PND-11
1.0% Hipochem CDL-60
and monosodium and/or disodium phosphate to adjust the pH to 7.±0.2.

The sleeve was cut into sections about 5 inches long and each section was weighed. The sleeves were then dipped in the methanol solutions shown below for 20 minutes. The sleeves were then removed from the solutions, dried and reweighed. The amount of material coated on the sleeves from each solution was based on the difference in weight between the coated and the uncoated sleeves, compared to the control.

The sleeves were then exposed to three cycles of ozone in an atmosphere of about 80 parts per hundred million of ozone at a temperature of 104°F., at a relative humidity of at least 95%. A cycle is that exposure which is completed when the internal nylon standard, dyed olive I, had faded sufficiently to give a ΔE of 2.8. The measurement ΔE is discussed under "Description of Preferred Embodiments".

The solutions, the amount of coating and the results of ozone exposure are listed below:

| | | % Pickup | ΔE |
|---|---|---|---|
| a) | Control - 200 ml. of methanol | 0 | 13.4 |
| b) | 1 gram of N,N-Bis-(2-hydroxypropyl)tallowamine in 200 ml. methanol | 1.16 | 1.1 |
| c) | 1 gram of N,N,N'-tris-(2-hydroxypropyl)-N'-oleyl-1,3-diaminopropane in 200 ml. methanol | 1.12 | 1.3 |
| d) | 1 gram N,N-bis-(2-hydroxypropyl)-laurylamine in 200 ml. methanol | 0.9 | 0.4 |
| e) | 1 gram N,N-bis-(2-hydroxypropyl)-stearylamine in 200 ml. methanol | 1.22 | 0.4 |
| f) | 3 grams N,N-Bis-(2-hydroxypropyl)tallowamine in 200 ml. methanol | 3.33 | 0.4 |
| g) | 3 grams N,N-Bis-(2-hydroxy-2-phenylethyl)stearylamine | 4.3 | 1.0 |
| h) | 1 gram N,N-bis(2-hydroxybutyl)stearylamine | 1.4 | 0.6 |

EXAMPLE III

Dyed sleeves similar to those described in Example II were coated with the chemicals in solution listed below, and exposed to ozone as described in Example II:

| | | % Pickup | ΔE |
|---|---|---|---|
| a) | Control - 200 ml. methanol | 0 | 7.7 |
| b) | 1 gram N,N-bis(2-hydroxybutyl)-cocoamine in 200 ml. methanol | 1.1 | 0.6 |
| c) | 3 grams N,N-bis(2-hydroxybutyl)-cocamine in 200 ml. methanol | 3.4 | 0.9 |
| d) | 3 grams N,N-bis(2-hydroxypropyl)-2'-ethylhexylamine in 200 ml. methanol | 1.2 | 0.2 |

EXAMPLE IV

Polycaprolactam was spun as in Example I but with various aqueous spin finishes. All finishes were 20% "solids" and 80% water. Of the solids, 40% were the additives listed below.

The yarns were drawn, knitted into sleeves, autoclaved, dyed and exposed to ozone. The results were as follows:

| Additive | Finish Pickup % | ΔE After 3 cycles |
|---|---|---|
| None | 10.2 | 11.2 |
| N-lauryl diisopropanolamine | 9.5 | 5.9 |
| N-tallow diisopropanolamine | 10.9 | 6.0 |
| N-tallow diisopropanolamine | 4.9 | 8.4 |
| N-oleyl-N',N'-tris(2-hydroxypropyl)-1,3-diaminopropane | 10.3 | 5.6 |

The dyed sleeves with the propoxylated amines in the finish were very close to the shade of the control. The dyed sleeve with the ethoxylated amine had a distinctly blue cast. Sleeves which have an N-substituted diethanolamine in the finish, i.e., an ethoxylated amine, have been frequently found to exhibit a blue cast, and a closer color matching has been found with propoxylates than with ethoxylates. This blue cast has been attributed to a loss of the yellow dye. The yellow basic dyes are known to be sensitive to heat in an alkaline environment, but it would be surprising if propoxylated amines are less basic than ethoxylated amines.

EXAMPLE V

One thousand grams of polycaprolactam of about 55 FAV, with about 50 carboxyl equivalents, and 50 amine equivalents per $10^6$ grams of polymer were blended with 20 grams of Varonic K202P [N,N-bis(2-hydroxypropyl)-cocoamine]. This blend was spun into yarn at a temperature of 275°C., plied and drawn at a 3.2 draw ratio into a 16 filament 70 total denier yarn, having a round cross-section.

This yarn and a yarn made in the same manner but without incorporation of any additive were both knitted into sleeves.

The sleeves were then dyed Disperse Olive I in separate dye baths having the following formulations:
  0.069% (O.W.F.) Disperse Blue 3 (C.I. 61505) such as Celliton Blue FFRN;
  0.0807% (O.W.F.) Celliton Pink R.F. (C.I. 60755)
  0.465% (O.W.F.) Celliton Yellow GA (C.I. 11855)
The Disperse Blue 3 is especially sensitive to ozone. The sleeves were then exposed to an ozone atmosphere of about 80 parts per hundred million (pphm) at a temperature of 104°F., and a relative humidity of at least 95%, for three cycles.

The results of this exposure are as follows:

| Sample | ΔE |
|---|---|
| Control | 8.5 |
| Sample with 2% Varonic K202P | 5.0 |

EXAMPLE VI

A bright, sebacic acid terminated polycaprolactam of about 70 relative formic acid viscosity, about 63 carboxyl equivalents, and 15 amine equivalents per $10^6$ grams of polymer were spun into yarn at a temperature of 285°C., plied and drawn at 3.0 draw ratio to give a drawn yarn of 140 filaments 2250 total denier, having a "Y" cross-section with a 3.0 modification ratio.

Separate portions of this yarn were coated with spin finishes containing respectively 0, 10%, and 10% of Varonic K202P. The finish pick-up was adjusted so that the yarn would pick up, respectively 0, 0.7 and 1.0% (O.W.F.) of Varonic K202P.

These yarns were then knitted into sleeves, and heat set by heating in an autoclave at 230°F. for five minutes, followed by three 10-minute cycles of steam treatment at 270°F.

The sleeves were then dyed Disperse Olive 1 as described in the above example and then exposed to ozone as in the above example. The results of the exposure are as follows:

| Sample | 4 HOURS | ΔE 8 HOURS | 14 HOURS |
|---|---|---|---|
| Control | 2.5 | 3.1 | 7.1 |
| 0.7% Varonic K202P | 1.7 | 2.4 | 3.2 |
| 1.0% Varonic K202P | 1.8 | 2.3 | 2.7 |

The structure of the dye, Sevron Yellow 8GMF is as follows:

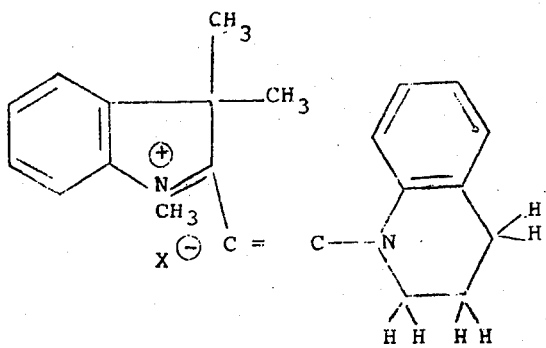

where X is an anion.

We claim:
1. In a method for dyeing polycarbonamide fibers with anthraquinone dyes, the improvement comprising coating the fiber with a substance consisting essentially of a compound selected from the group consisting of tertiary amines

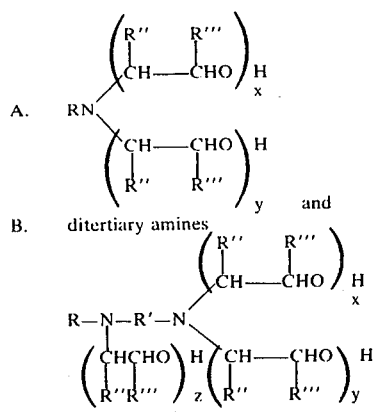

A. and B. ditertiary amines where R is an alkyl radical having 8 to 25 carbon atoms, R' is an alkylene radical having 2 to 10 carbon atoms, R'' and R''' are independently selected from hydrogen, a phenyl or an alkyl radical of 1 to 3 carbon atoms, provided that R'' and R''' cannot both be hydrogen atoms, $x$, $y$ and $z$ are each whole numbers, and in compound A $(x+y)$ is not greater than 6, and in compound B $(x+y+z)$ is not greater than 9, so that an amount of from about 0.4 to about 5 percent on weight of fiber remains on said fiber after dyeing to be exposed to ozone, whereby the dyed polycarbonamide fiber has improved fastness of dye when exposed to ozone.

2. The method of claim 1 wherein said coating is applied prior to dyeing said fiber.

3. The method of claim 1 wherein said coating is applied subsequently to dyeing said fiber.

4. The method of claim 1 wherein said anthraquinone dyes are disperse dyes.

5. The method of claim 1 wherein said anthraquinone dyes are basic dyes.

6. The method of claim 5 wherein $(x+y)$ is 2 and $(x+y+z)$ is 3.

* * * * *